Aug. 15, 1950  J. D. MINER, JR  2,519,272
DIRECT-CURRENT GENERATOR
Filed Feb. 13, 1948

WITNESSES:
Robert C. Baird

INVENTOR
John D. Miner, Jr.
BY
ATTORNEY

Patented Aug. 15, 1950

2,519,272

UNITED STATES PATENT OFFICE 2,519,272

DIRECT-CURRENT GENERATOR

John D. Miner, Jr., Lima, Ohio, assignor to Westinghouse Electric Corporation, East Pittsburgh, Pa., a corporation of Pennsylvania Application February 13, 1948, Serial No. 8,033

5 Claims. (Cl. 322—64)

The present invention relates to direct-current generators, and more particularly to a direct-current generator which is adapted to operate in connection with an auxiliary control or protective system which is actuated by the voltage drop across a part of the generator windings.

The invention is particularly adapted for use in direct-current aircraft generators, although it will be obvious that its usefulness is not necessarily restricted to this particular application. The electrical systems used on airplanes usually include two or more generators operating in parallel, and it is necessary to provide means for maintaining proper division of load between the generators. This is usually done by means of auxiliary equalizing coils on the voltage regulators which are associated with the generators, and these coils are connected to be responsive to voltage drops which are proportional to the load currents of the generators, so that if the loads become unequal on different generators, the corresponding voltage drops become unequal, and the regulators are caused to operate to restore proper load division. In the usual practice, the voltage drop across the commutating field winding and compensating field winding in each generator is utilized for this purpose, since these windings are connected in series with the armature and carry the generator load current, and an auxiliary terminal is therefore usually provided on aircraft generators connected between the commutating field winding and the armature.

More recently, certain other control and protective devices have been developed and have come into use which are also intended to be actuated by, or in response to, a voltage drop proportional to the generator load current, and these devices are usually connected in an auxiliary control circuit which is connected to the auxiliary terminal on the generator mentioned above. In many cases, this auxiliary external control circuit may draw a relatively large current, and since this circuit is in parallel with the commutating and compensating field windings of the generator, this current is diverted from these windings and may weaken the commutating and compensating fields to a sufficient extent to adversely affect the performance of the machine and to make it difficult to obtain satisfactory commutation. If the resistance of the external control circuit is known and is constant, the commutating and compensating field windings of the generator could, of course, be designed with an increased number of turns so as to compensate for the reduced current. This is not a satisfactory solution of the problem, however, since a generator designed in this way would be badly overcompensated, and would be very unstable if it should be operated without the external control circuit, or with a circuit having a substantially higher resistance than that for which the generator was designed.

The principal object of the present invention is to provide a direct-current generator which is adapted to operate with an external control or protective circuit, or other auxiliary circuit, connected across its commutating and compensating field windings without adversely affecting the performance or commutation of the generator.

Another object of the invention is to provide a direct-current generator which is adapted to operate with an external control circuit, or other auxiliary circuit, connected across its commutating field winding, and in which an auxiliary commutating field winding is provided on the generator and connected in series with the external auxiliary circuit so as to carry the same current and thus to compensate for the current diverted from the main commutating field winding of the generator.

A further object of the invention is to provide a direct-current generator adapted to operate with an external auxiliary circuit connected across its commutating field winding, with an auxiliary commutating winding connected in series with the external circuit to compensate for current diverted from the main commutating field winding, and which also has means for accurately controlling the voltage applied to the external auxiliary circuit.

Other objects and advantages of the invention will be apparent from the following detailed description, taken in connection with the accompanying drawing, in which.

Figure 1:
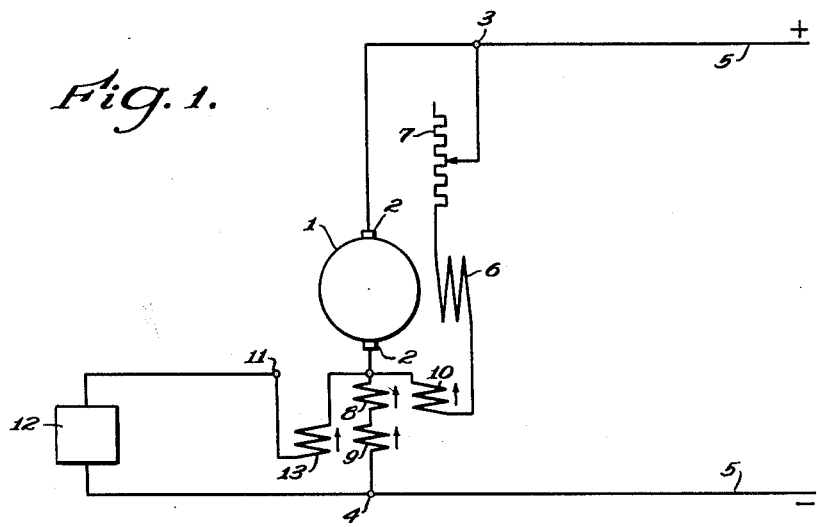
Figure 1 is a schematic diagram showing one embodiment of the invention.

The invention is shown in Fig. 1 applied to a direct-current generator which may be of any suitable physical construction. The generator has an armature member 1, which is preferably the rotatable member of the generator, and which is provided with brushes 2 connected to the main terminals 3 and 4 of the generator, to which the load circuit 5 may be connected. A main shunt field winding 6 is provided on the field member of the generator and connected across the armature 1. An external field rheostat or voltage regulator 7 is preferably connected in series with the field winding 6 to control the shunt field current and thus the voltage of the generator. The regulator 7 has been shown merely as an adjustable resistance, but it will be understood that in actual practice a voltage regulator of any suitable type will usually be utilized, and it is to be understood that the variable resistor 7 is intended to be representative of any suitable type of rheostat or voltage regulator.

A commutating field winding 8 is provided on the field member of the generator, preferably being disposed on interpoles in the usual manner, and a compensating field winding 9 is preferably also provided, in slots in the main pole faces. The commutating and compensating field windings 8 and 9 are connected in series with each other and with the armature 1 between the armature and the main generator terminal 4. If desired, an auxiliary field winding 10 may also be placed on the interpoles and connected in series with the shunt field winding 6 in order to overexcite the commutating field to provide a compounding effect at low speeds when the field current is high, so as to increase the range of speed over which the generator may be operated, as more fully described and claimed in my copending application, Serial No. 741,901, filed April 16, 1947, and assigned to Westinghouse Electric Corporation. This winding is not a part of the present invention and may be omitted if it is not needed. All three of the windings 8, 9 and 10 are wound and connected so that their effect is additive, as indicated by the arrows in Fig. 1.

As mentioned above, when two or more generators of this type are operated in parallel, their voltage regulators are provided with auxiliary coils which are responsive to voltage drops proportional to the generator load currents to insure proper division of load between the generators. In the usual practice, the voltage drop across the commutating and compensating field windings 8 and 9 is utilized for this purpose, since it is proportional to the load current, and aircraft generators are therefore usually provided with an auxiliary terminal 11 connected between the commutating winding and the armature. More recently, there have been developed protective and control devices for aircraft generators and aircraft electrical systems which are also intended to be operated by this same voltage drop, and which may be connected to the auxiliary terminal 11 of the generator for this purpose, such a control circuit being indicated at 12 in Fig. 1. A system of this kind is shown, for example, in the copending application of B. O. Austin et al., Serial No. 12,118, filed February 28, 1948, and assigned to Westinghouse Electric Corporation, and the auxiliary circuit 12 in the drawing is to be understood as representing any desired circuit of this general kind.

Since the auxiliary circuit 12 is shunted across the commutating and compensating field windings 8 and 9, the current drawn by the circuit 12 is diverted from these windings and the fields produced by them are accordingly weakened. In many instances, the current diverted from the commutating field in this way may be high enough to have serious consequences. As a specific example, reference may be made to an aircraft generator rated at 30 volts and 300 amperes. In this particular generator, the normal full-load voltage drop across the windings 8 and 9 was 2.4 volts. One particular auxiliary control and protective circuit 12 intended for use with this generator had a combined resultant resistance of 0.2 ohm, so that the current diverted from the commutating field winding 8 through the auxiliary circuit was 12 amperes, or 4% of the normal full-load current. Since most aircraft generators have compensating windings, they require a relatively low ratio of commutating field ampere-turns to armature ampere-turns, which may be as low as 6%. It will be apparent, therefore, that a current as large as that indicated in the specific example given, diverted from the main commutating field winding, would seriously unbalance the strengths of the commutating and compensating windings, and result in poor commutation and unsatisfactory performance of the generator.

In accordance with the present invention, this effect is avoided by providing an auxiliary commutating field winding 13, which is connected in series with the auxiliary terminal 11 so that it is in series with the external circuit 12 and carries the same current. The auxiliary commutating field winding 13 is connected so that its effect is additive with that of the main commutating field winding 8 and the compensating field winding 9, so that the ampere-turns provided by this auxiliary winding add to the effect of the main commutating field winding and thus compensate for the current diverted from the winding 8. The auxiliary commutating field winding 13 may be placed in any suitable location on the machine, and preferably is placed in slots in the pole faces, together with the compensating field winding 9, as indicated diagrammatically by the position of the winding 13 on the drawing. The invention is not restricted, however, to any specific location of the winding 13, or of the windings 8 and 9, since these windings may be placed in any suitable or convenient location on the machine so long as they lie in the quadrature axis of the machine and all have the same direction of excitation, as indicated by the arrows. The auxiliary commutating winding 13, of course, requires some additional space in the machine, but this is not a serious objection since the space required for this winding is not large, as it does not have to carry a very high current and the total number of turns required is not large.

It will be apparent that the provision of the auxiliary commutating field winding 13 overcomes the difficulties discussed above, since the current diverted from the main commutating field winding 8 flows through the auxiliary winding 13, which is additive with the winding 8, and therefore, the total commutating flux available in the machine is the same as though the entire load current flowed through the winding 8, so that satisfactory commutation and good performance of the generator are obtainable even though the auxiliary control circuit 12 may include a considerable number of contactors, relays and other devices which draw a relatively large current from the generator.

Figure 2:
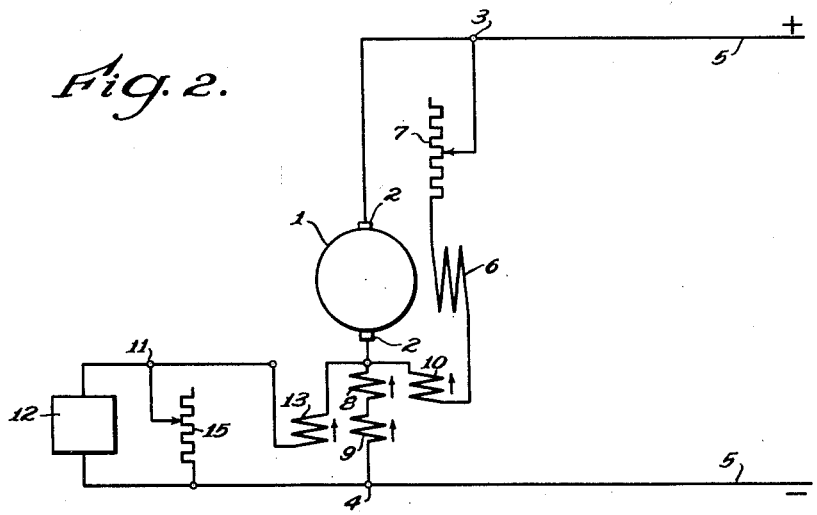
Fig. 2 is a similar diagram showing a further embodiment of the invention.

In some cases, it is necessary to be able to adjust the voltage applied to the auxiliary control circuit 12 at full load to a quite accurate value. When this is necessary, it may readily be accomplished in the manner shown in Fig. 2, by connecting a variable resistor 15 between the auxiliary terminal 11 and the main generator terminal 4. It will be apparent from Fig. 2 that the resistor 15, in combination with the resistance of the auxiliary commutating winding 13, functions as a potentiometer, and by adjusting the resistance 15, the voltage of the auxiliary terminal 11 with respect to the main generator terminal 4 may be accurately adjusted. It will be apparent that a relatively large amount of power can be utilized in this circuit, if necessary to obtain good regulation, without disturbing the balance between the commutating and compensating fields and the armature, so that accurate adjustment of the voltage applied to the auxiliary circuit can be obtained without adversely affecting the operation of the generator.

It will be apparent that various modifications may be made within the scope of the invention. Thus, the auxiliary interpole winding 10 may be omitted, if desired, since it is not a necessary part of the invention, and in some cases, the compensating field winding 9 may not be needed, although it is usually desirabe. The various commutating and compensating windings may be disposed on the machine in any desired manner so long as they all have the same direction of excitation and lie in the quadrature axis of the machine. The negative generator terminal 4 has been shown connected to a wire return circuit, but in actual practice this terminal of aircraft generators is usually grounded and a ground return utilized rather than a wire return circuit. The invention is, of course, applicable to either arrangement.

Certain preferred embodiments of the invention have been shown and described for the purpose of illustration, but it will be apparent that various other embodiments and modifications may be made, and it is to be understood that the invention is not limited to the specific arrangement shown and described, but in its broadest aspects, it includes all equivalent embodiments and modifications which come within the scope of the appended claims.

I claim as my invention:

1. A direct-current generator having an armature member and a field member, a main shunt field winding on the field member, a commutating field winding on the field member, said commutating field winding being connected in series between the armature member and a main terminal of the generator, auxiliary terminal means for connecting an external circuit in parallel with the commutating field winding, an auxiliary commutating field winding on the field member, one end of said auxiliary commutating field winding being connected to the armature member and the other end of the auxiliary commutating field winding being connected to the auxiliary terminal means and being disposed so that it is additive with the first-mentioned commutating field winding, and potentiometer means connected between the auxiliary terminal means and said main terminal for adjusting the potential of said auxiliary terminal means with respect to said main terminal.

2. A direct-current generator having an armature member and a field member, a main shunt field winding on the field member, a commutating field winding on the field member, said commutating field winding being connected in series between the armature member and a main terminal of the generator, auxiliary terminal means for connecting an external circuit in parallel with the commutating field winding, an auxiliary commutating field winding on the field member, one end of said auxiliary commutating field winding being connected to the armature member and the other end of the auxiliary commutating field winding being connected to the auxiliary terminal means and being disposed so that it is additive with the first-mentioned commutating field winding, and an adjustable resistor connected between said auxiliary terminal means and said main terminal.

3. A direct-current generator having an armature member and a field member, a main shunt field winding on the field member, a commutating field winding on the field member, said commutating field winding being connected in series between the armature member and a main terminal of the generator, an auxiliary commutating field winding on the field member, means for connecting one end of said auxliary commutating field winding between the armature member and the first-mentioned commutating field winding, auxiliary terminal means connected to the other end of the auxiliary commutating field winding, the auxiliary commutating field winding being disposed so that it is additive with the first-mentioned commutating field winding, and an adjustable resistor connected between said auxiliary terminal means and said main terminal.

4. A direct-current generator having an armature member and a field member, a main shunt field winding on the field member, a commutating field winding and a compensating field winding on the field member, said commutating and compensating field windings being connected in series with each other between the armature member and a main terminal of the generator, auxiliary terminal means for connecting an external circuit in parallel with the commutating and compensating field windings, an auxiliary commutating field winding on the field member, one end of said auxiliary commutating field winding being connected to the armature member and the other end of the auxiliary commutating field winding being connected to the auxiliary terminal means and being disposed so that it is additive with the first-mentioned commutating field winding, and potentiometer means connected between the auxiliary terminal means and said main terminal for adjusting the potential of said auxiliary terminal means with respect to said main terminal.

5. A direct-current generator having an armature member and a field member, a main shunt field winding on the field member, a commutating field winding and a compensating field winding on the field member, said commutating and compensating field windings being connected in series with each other between the armature member and a main terminal of the generator, auxiliary terminal means for connecting an external circuit in parallel with the commutating and compensating field windings, an auxiliary commutating field winding on the field member, one end of said auxiliary commutating field winding being connected to the armature member and the other end of the auxiliary commutating field winding being connected to the auxiliary terminal means and being disposed so that it is additive with the first-mentioned commutating field winding, and an adjustable resistor connected between said auxiliary terminal means and said main terminal.

JOHN D. MINER, Jr.

REFERENCES CITED

The following references are of record in the file of this patent:

UNITED STATES PATENTS

| Number | Name | Date |
| --- | --- | --- |
| 2,166,187 | Stivender | July 18, 1939 |